(12) United States Patent
Bandyopadhyay et al.

(10) Patent No.: US 8,999,200 B2
(45) Date of Patent: Apr. 7, 2015

(54) CONDUCTIVE THERMOPLASTIC COMPOSITES AND METHODS OF MAKING

(75) Inventors: Sumanda Bandyopadhyay, Bangalore (IN); Darren Clark, Thorndale, PA (US); Soumyadeb Ghosh, Bangalore (IN)

(73) Assignee: Sabic Global Technologies B.V. (NL)

( * ) Notice: Subject to any disclaimer, the term of this patent is extended or adjusted under 35 U.S.C. 154(b) by 482 days.

(21) Appl. No.: 10/248,702

(22) Filed: Feb. 11, 2003

(65) Prior Publication Data

US 2004/0016912 A1     Jan. 29, 2004

Related U.S. Application Data

(60) Provisional application No. 60/319,419, filed on Jul. 23, 2002.

(51) Int. Cl.
| | |
|---|---|
| *H01B 1/24* | (2006.01) |
| *C08K 3/04* | (2006.01) |
| *C08K 7/02* | (2006.01) |
| *C08K 5/00* | (2006.01) |
| *C08K 5/01* | (2006.01) |
| *H01C 17/065* | (2006.01) |

(52) U.S. Cl.
CPC .. *H01B 1/24* (2013.01); *C08K 3/04* (2013.01); *C08K 5/0091* (2013.01); *C08K 5/01* (2013.01); *H01C 17/06586* (2013.01)

(58) Field of Classification Search
CPC .......... H01B 1/24; C08K 5/0091; C08K 5/34; C08K 3/04; C08K 7/02
USPC ................... 252/511, 502, 519.1, 500, 519.2; 264/452, 464, 478, 172.21; 525/166, 525/176; 977/742, 750, 752, 753; 423/449.1, 458, 445 B; 428/323, 355 N; 524/88–91, 495, 496
See application file for complete search history.

(56) References Cited

U.S. PATENT DOCUMENTS

| | | | |
|---|---|---|---|
| 2,071,250 | A | 7/1931 | Carothers |
| 2,071,251 | A | 7/1937 | Carothers |
| 2,130,523 | A | 9/1938 | Carothers |
| 2,130,948 | A | 9/1938 | Carothers |
| 2,241,322 | A | 5/1941 | Hanford |

(Continued)

FOREIGN PATENT DOCUMENTS

| | | |
|---|---|---|
| DE | 4220411 | 12/1993 |
| EP | 0 279 985 A2 | 7/1987 |

(Continued)

OTHER PUBLICATIONS

Data Sheet for Black Pearls 2000, Cabot, Apr. 2003.1-page.*

(Continued)

*Primary Examiner* — Stanley Silverman
*Assistant Examiner* — Kallambella Vijayakumar
(74) *Attorney, Agent, or Firm* — Cantor Colburn LLP

(57) ABSTRACT

A polymeric composite comprises a polymeric resin; an electrically conductive filler; and a polycyclic aromatic compound, in an amount effect to increase the electrical conductivity of the polymeric composition relative to the same composition without the polycyclic aromatic compound. The addition of the polycyclic aromatic compound in addition to a conductive filler imparts improved electrical and mechanical properties to the compositions.

12 Claims, 1 Drawing Sheet

(56) References Cited

U.S. PATENT DOCUMENTS

| | | | | |
|---|---|---|---|---|
| 2,312,966 A | | 3/1943 | Hanford | |
| 2,512,606 A | | 6/1950 | Bolton et al. | |
| 3,379,792 A | | 4/1968 | Finhold | |
| 3,565,910 A | * | 2/1971 | Elbert et al. | 524/88 |
| 3,992,218 A | * | 11/1976 | Suetsugu et al. | 106/478 |
| 4,005,053 A | | 1/1977 | Briggs et al. | 260/33.6 AQ |
| 4,208,318 A | * | 6/1980 | Ono et al. | 524/88 |
| 4,353,816 A | | 10/1982 | Iwasa | |
| 4,452,846 A | * | 6/1984 | Akao | 428/220 |
| 4,477,608 A | | 10/1984 | Bäbler et al. | |
| 4,518,728 A | * | 5/1985 | Pollard | 524/88 |
| 4,554,094 A | | 11/1985 | Bäbler et al. | |
| 4,565,684 A | | 1/1986 | Tibbetts et al. | 423/447.3 |
| 4,572,813 A | | 2/1986 | Arakawa | 264/29.2 |
| 4,663,084 A | * | 5/1987 | Shirai et al. | 252/600 |
| 4,663,230 A | | 5/1987 | Tennent | 428/367 |
| 4,670,188 A | | 6/1987 | Iwasa et al. | |
| 4,816,289 A | | 3/1989 | Komatsu et al. | 423/447.3 |
| 4,876,078 A | | 10/1989 | Arakawa et al. | 423/447.3 |
| 4,970,272 A | | 11/1990 | Gallucci | |
| 4,971,726 A | | 11/1990 | Maeno et al. | 252/511 |
| 5,024,818 A | | 6/1991 | Tibbetts et al. | 422/158 |
| 5,115,018 A | * | 5/1992 | Akkapeddi et al. | 525/64 |
| 5,132,365 A | | 7/1992 | Gallucci | |
| 5,145,904 A | * | 9/1992 | Muehlbach et al. | 524/494 |
| 5,165,909 A | | 11/1992 | Tennent et al. | 423/447.3 |
| 5,360,658 A | | 11/1994 | Schmitz et al. | 428/215 |
| 5,445,327 A | | 8/1995 | Creehan | 241/22 |
| 5,484,837 A | | 1/1996 | Kung et al. | 524/495 |
| 5,556,892 A | | 9/1996 | Pekala | 521/181 |
| 5,589,152 A | | 12/1996 | Tennent et al. | 423/447.3 |
| 5,591,312 A | | 1/1997 | Smalley | 204/157.41 |
| 5,591,382 A | | 1/1997 | Nahass et al. | 252/511 |
| 5,591,832 A | | 1/1997 | Koshijima et al. | 530/500 |
| 5,641,455 A | | 6/1997 | Rosenlund et al. | 422/28 |
| 5,643,990 A | * | 7/1997 | Uehara et al. | 524/494 |
| 5,651,922 A | | 7/1997 | Nahass et al. | 252/511 |
| 5,654,357 A | | 8/1997 | Menashi et al. | 524/495 |
| 5,712,332 A | * | 1/1998 | Kaieda et al. | 524/88 |
| 5,739,319 A | * | 4/1998 | Yamasaki | 540/140 |
| 5,744,235 A | | 4/1998 | Creehan | 428/364 |
| 5,830,326 A | | 11/1998 | Iijima | 204/173 |
| 5,846,647 A | | 12/1998 | Yoshino et al. | 428/328 |
| 5,847,034 A | * | 12/1998 | Achenbach et al. | 524/91 |
| 5,872,177 A | | 2/1999 | Whitehouse | 524/495 |
| 5,919,429 A | | 7/1999 | Tanaka et al. | 423/445 B |
| 6,183,714 B1 | | 2/2001 | Smalley et al. | 423/447.3 |
| 6,506,830 B1 | * | 1/2003 | Bussi et al. | 524/495 |
| 6,593,411 B2 | | 7/2003 | Koevoets et al. | |
| 7,049,362 B2 | * | 5/2006 | Kakegawa | 524/495 |
| 2003/0089893 A1 | * | 5/2003 | Niu et al. | 252/500 |
| 2003/0166762 A1 | | 9/2003 | Koevoets et al. | |
| 2004/0085619 A1 | | 5/2004 | Wu et al. | |
| 2004/0206941 A1 | | 10/2004 | Gurin | |
| 2005/0004269 A1 | | 1/2005 | Kakegawa | |
| 2005/0152618 A1 | | 7/2005 | Takahashi | |

FOREIGN PATENT DOCUMENTS

| | | | | |
|---|---|---|---|---|
| FR | WO99/33908 | * | 7/1999 | C08K 3/00 |
| JP | 51-022092 A | * | 2/1976 | H01B 1/04 |
| JP | 54099154 | | 8/1979 | |
| JP | 56-116731 A | * | 9/1981 | C08K 5/01 |
| JP | 60-013818 A | * | 1/1985 | C08J 3/20 |
| JP | 62-020540 A | * | 1/1987 | C08K 7/02 |
| JP | 2196854 | | 8/1990 | |
| JP | 4146958 | | 5/1992 | |
| JP | 6041414 | | 11/1994 | |
| JP | 07-196918 | * | 8/1995 | C08L 83/04 |
| JP | 07196918 | | 8/1995 | |
| JP | 10219167 | | 8/1998 | |
| JP | WO00/40642 | * | 7/2000 | C08K 3/04 |

OTHER PUBLICATIONS

Data Sheet, Hawleys Condensed Dictionary, 2002, pp. 2.*
JP 07-196918 Publication Date Aug. 1, 1995. "Silicone Rubber Composition Having Stabilized Electrical Characteristics" (Abstract Only).
JP 09-015188 Publication Date Jan. 17, 1997. "Electrochemical Analyzer" (Abstract Only).
JP 61159456 Publication Date Jul. 19, 1986. "Resin Composition" (Abstract Only).
JP 62279934 Publication Date Dec. 4, 1987. "Heat-Resistant Conductive Film or Sheet" (Abstract Only).
JP 2001286338 A Publication Date Oct. 16, 2001. "Cartridge-Type Case for Bar Cosmetic" (Abstract Only).
JP 1022092 Publication Date Jan. 25, 1989. "Substrate for High Frequency Circuit" (Abstract Only).
JP 2139143 Publication Date May 29, 1990. "Fitting Method for Part" (Abstract Only).
JP 2000-267323 Publication Date Sep. 29, 2000. "Electrophotographic Photoreceptor" (Abstract Only).
JP 2005054045 Publication Date Mar. 3, 2005. "Epoxy Resin Molding Compound for Sealing Use and Electronic Component Device" (Abstract Only).
JP54099154, Aug. 4, 1979, English Abstract Only, 1 page.
JP10219167, Aug. 18, 1998, English Abstract Only, 1 page.
DE4220411, Dec. 23, 1993, English Abstract Only, 1 page.
International Search Report, International Application No. PCT/US 03/18632, International Filing Date Jun. 12, 2003, Applicant's File Reference 08CE125790, Date of Mailing Nov. 22, 2005, 7 pages.

* cited by examiner

CONDUCTIVE THERMOPLASTIC COMPOSITES AND METHODS OF MAKING

CROSS REFERENCE TO RELATED APPLICATIONS

This application claims the benefits of U.S. Provisional Patent Application Ser. No. 60/319,419 filed Jul. 23, 2002, which is fully incorporated herein by reference.

BACKGROUND

This disclosure relates to polymer composites, and in particular to conductive polymer composites.

Plastic (polymeric resin) is often the material of choice for components in electronic products such as computers, photocopiers, and the like because it offers design flexibility, cost-effective manufacturing, and light weight products. In order to function efficiently in such applications, normally insulating polymeric resin can be made electrically conductive to provide electromagnetic shielding, electrostatic dissipation, or antistatic properties to such components.

Mixing polymeric resins with an electrically conductive material such as graphite powder and/or carbon black powder can increase the electrical and thermal conductivity of a thermoplastic. In U.S. Pat. No. 4,971,726 to Maeno et al. and U.S. Pat. No. 5,846,647 to Makise et al., thermoplastic resins comprising a combination of carbon black and graphite are disclosed. U.S. Pat. No. 5,360,658 to Schmitz et al., Japanese Patent No. JP6041414 to Schmitz et al., and Japanese Patent No. JP2196854 to Toshihiko et al. disclose conductive polycarbonate compositions produced from thermoplastic polycarbonate, polyalkylene terephthalate, and carbon black. Japanese Patent No. JP4146958 discloses conductive compositions comprising a polycarbonate resin, a polybutylene terephthalate resin and/or an acrylic copolymer and carbon black. Due to the high loadings of conductive fillers used in the above-described compositions, a decrease in moldability and degraded mechanical properties, including poor elongation and reduced impact strength, is often observed. There thus remains a need for conductive thermoplastic compositions with enhanced electrical properties without a significant reduction in mechanical properties.

BRIEF SUMMARY

The above drawbacks and disadvantages are overcome or alleviated by a polymeric composite comprising a polymeric resin; a conductive filler; and a polycyclic aromatic compound, in an amount effective to increase the electrical conductivity of the polymeric composition relative to the same composition without the polycyclic aromatic compound. Also disclosed is a method of forming a polymeric composition, comprising melt blending a polymeric resin, a conductive filler and a polycyclic aromatic compound, wherein the electrical conductivity of the polymeric composite is enhanced relative to the same composition without the polycyclic aromatic compound.

DETAILED DESCRIPTION OF THE PREFERRED EMBODIMENTS

Figure 1:
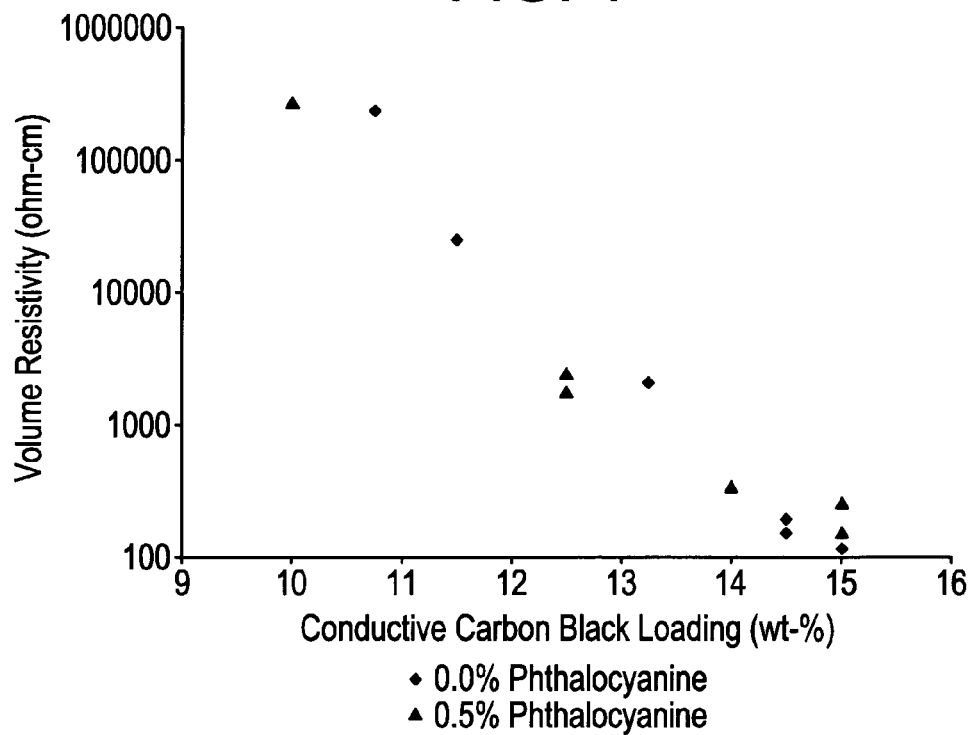
FIG. 1 shows the effect of copper phthalocyanine on the percolation curve of conductive carbon black in a blend of polycarbonate and polybutylene terephthalate.

It has been unexpectedly found that a polymeric composite composition comprising one or more polycyclic aromatic compounds in addition to a conductive filler has enhanced electrical conductivity and a negligible effect on the mechanical properties. Alternatively, polymer composite composition comprising polycyclic aromatic compounds can achieve the comparable conductivity using lower conductive filler levels than conductive polymer composites without polycyclic aromatic compounds, resulting in improved mechanical properties of the composites. The polycyclic aromatic compound can be, for example, phthalocyanine and phthalocyanine derivatives, porphyrin and porphyrin derivatives, pyrene and pyrene derivatives, anthracene and anthracene derivatives, or combinations comprising one or more of the foregoing compounds.

The polymeric resin used in the composites may be selected from a wide variety of thermoplastic resins, thermoplastic elastomers, and thermoset resins, as well as combinations comprising one or more of the foregoing resins. Specific nonlimiting examples of suitable thermoplastic resins include polyacetal, polyacrylic, styrene acrylonitrile, acrylonitrile-butadiene-styrene (ABS), polycarbonate, polystyrene, polyethylene, polyphenylene ether, polypropylene, polyethylene terephthalate, polybutylene terephthalate, Nylons (Nylon-6, Nylon-6/6, Nylon-6/10, Nylon-6/12, Nylon-11 or Nylon-12, for example), polyamideimide, polyarylate, polyurethane, ethylene propylene diene rubber (EPR), ethylene propylene diene monomer (EPDM), polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers and mixtures comprising any one of the foregoing thermoplastics. Preferred thermoplastic resins include polycarbonate, polybutylene terephthalate, and mixtures comprising one or more of the foregoing resins.

Specific nonlimiting examples of blends of thermoplastic resins include acrylonitrile-butadiene-styrene/Nylon, polycarbonate/acrylonitrile-butadiene-styrene, acrylonitrile butadiene styrene/polyvinyl chloride, polyphenylene ether/polystyrene, polyphenylene ether/Nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, Nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyether etherketone/polyetherimide polyethylene/Nylon, polyethylene/polyacetal, and the like.

Specific nonlimiting examples of thermosetting resins include polyurethane, natural rubber, synthetic rubber, epoxy, phenolics, polyesters, polyphenylene ether, polyamides, silicones, and mixtures comprising any one of the foregoing thermosetting resins. Blends of thermosetting resins as well as blends of thermoplastic resins with thermosetting resins can be utilized.

Polymeric resins are generally used in amounts of greater than or equal to about 10 weight percent (wt %), preferably greater than or equal to about 30 wt %, and more preferably greater than or equal to about 40 wt % of the total weight of the composition. The polymeric resins are furthermore generally used in amounts of less than or equal to about 99.5 wt %, preferably less than or equal to about 85 wt %, and more preferably less than or equal to about 80 wt % of the total weight of the composition.

The polymeric composition further comprises a conductive filler. Suitable conductive fillers include solid conductive metallic fillers or inorganic fillers coated with a solid metallic filler. These solid conductive metal fillers may be an electrically conductive metal or alloy that does not melt under conditions used when incorporating them into the polymeric resin, and fabricating finished articles therefrom. Metals such as aluminum, copper, magnesium, chromium, tin, nickel, silver, iron, titanium, and mixtures comprising any one of the foregoing metals can be incorporated into the polymeric resin as solid metal particles. Physical mixtures and true alloys such as stainless steels, bronzes, and the like, can also serve as metallic constituents of the conductive filler particles herein. In addition, a few intermetallic chemical compounds such as borides, carbides, and the like, of these metals (e.g., titanium diboride) can also serve as metallic constituents of the conductive filler particles herein. Solid non-metallic, conductive filler particles such as tin-oxide, indium tin oxide, and the like may also be added to the polymeric resin. The solid metallic and non-metallic conductive fillers may exist in the form of drawn wires, tubes, nanotubes, flakes, laminates, platelets, ellipsoids, discs, and other commercially available geometries. Preferred conductive fillers include carbonaceous fillers such as carbon nanotubes (single-walled and multi-walled), vapor-grown carbon fibers having diameters of about 2.5 to about 500 nanometers, carbon fibers such as PAN carbon fibers, carbon black, graphite, and mixtures comprising one or more of the foregoing fillers.

Various types of conductive carbon fibers may be classified according to their diameter, morphology, and degree of graphitization (morphology and degree of graphitization being interrelated). These characteristics are presently determined by the method used to synthesize the carbon fiber. For example, carbon fibers having diameters of about 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch. These types of fibers have a relatively lower degree of graphitization.

Small carbon fibers having diameters of about 3 to about 2000 nanometers, and "tree-ring" or "fishbone" structures, are presently grown from hydrocarbons in the vapor phase, in the presence of particulate metal catalysts at moderate temperatures, i.e., about 800° C. to about 1 500° C., and thus are commonly known as "vapor-grown carbon fibers". These carbon fibers are generally cylindrical, and have a hollow core. In the "tree-ring" structure, a multiplicity of substantially graphitic sheets is coaxially arranged about the core, wherein the c-axis of each sheet is substantially perpendicular to the axis of the core. The interlayer correlation is generally low. In the "fishbone" structure, the fibers are characterized by graphite layers extending from the axis of the hollow core, as shown in EP 198 558 to Geus. A quantity of pyrolytically deposited carbon may also be present on the exterior of the fiber. Graphitic or partially graphitic vapor grown carbon fibers having diameters of about 3.5 nanometers to about 500 nanometers, with diameters of about 3.5 nanometers to about 70 nanometers being preferred, and diameters of about 3.5 nanometers to about 50 nanometers, can be used. Representative vapor grown carbon fibers described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Carbon nanotubes are fullerene-related structures that consist of graphene cylinders, which may be open or closed at either end with caps containing pentagonal and/or hexagonal rings. Nanotubes may consist of a single wall, or have multiple concentrically arranged walls, and have diameters of about 0.7 nanometers to about 2.4 nanometers for the single-walled nanotubes and about 2 nanometers to about 50 nanometers for the multi-walled nanotubes. In the multi-layer structure, the cross-section of the hollow core becomes increasingly small with increasing numbers of layers. At diameters larger than about 10 nanometers to about 20 nanometers, multi-wall nanotubes begin to exhibit a hexagonal pillar shape, such that the curvature of the nanotubes becomes concentrated at the corners of the pillars. Carbon nanotubes may be produced by laser-evaporation of graphite, carbon arc synthesis, or under low hydrocarbon pressures in the vapor phase. Representative carbon nanotubes are described in U.S. Pat. Nos. 6,183,714 to Smalley et al., U.S. Pat. No. 5,591,312 to Smalley, U.S. Pat. No. 5,641,455 to Ebbesen et al., U.S. Pat. No. 5,830,326 to Iijima et al., U.S. Pat. No. 5,591,832 to Tanaka et al., U.S. Pat. No. 5,919,429 to Tanaka et al.

Carbon black may also be used as the conductive filler. Commercially available carbon blacks include conductive carbon black that is used in modifying the electrostatic dissipation (ESD) properties of thermoplastic resins. Such carbon blacks are sold under a variety of trade names, including but not limited to S.C.F. (Super Conductive Furnace), E.C.F. (Electric Conductive Furnace), Ketjen Black EC (available from Akzo Co., Ltd.) or acetylene black. Preferred carbon blacks are those having average particle sizes less than about 200 nanometers, preferably less than about 100 nanometers, more preferably less than about 50 nanometers. Conductive carbon blacks may also have surface areas greater than about 100 square meter per gram ($m^2/g$), preferably greater than about 400 $m^2/g$, yet more preferably greater than about 800 $m^2/g$. Conductive carbon blacks may have a pore volume (dibutyl phthalate absorption) greater than about 40 cubic centimeters per hundred grams ($cm^3/100$ g), preferably greater than about 100 $cm^3/100$ g, more preferably greater than about 150 $cm^3/100$ g.

Graphite may also be used as the conductive filler. Graphite is a crystalline form of carbon that typically adopts a layered, hexagonal conformation. Graphite is commercially available in powder, flake, exfoliated, expanded, and amorphous forms. Powders can have particle sizes, for example, of about 45 to about 150 micrometers. Micronised powders can have particles sizes of about 2 micrometers or greater. Graphite flakes can have sizes of about 50 to about 600 micrometers.

In general, conductive fillers are used in an amount of greater than or equal to about 0.25 wt %, preferably greater than or equal to about 0.5 wt %, and more preferably greater than or equal to about 1.0 wt %, of the total weight of the composition. The conductive fillers are furthermore present in amounts of less than or equal to about 60 wt %, preferably less than or equal to about 40 wt %, and more preferably less than or equal to about 20 wt %, of the total weight of the composition.

The polymeric composites also include a polycyclic aromatic compound. The polycyclic aromatic compound is one that enhances the electrical conductivity of the conductive composites. Such polycyclic aromatic compounds include phthalocyanines, porphyrins, pyrenes, anthracenes, and combinations comprising one or more of the foregoing compounds. Without being held to theory, it is believed that addition of polycyclic aromatic compounds to conductive composites increases electrical conductivity by either increasing the number of interparticle contacts or by decreasing the resistance to the electron transfer between the conductive particles.

The polycyclic aromatic compound can be a phthalocyanine, which is the tetraaza derivative of tetrabenzoporphyrin. Suitable phthalocyanines can be those with or without metal centers. Derivatives of phthalocyanines substituted in the benzene rings have been used as pigments and dyes. The structure of a substituted phthalocyanine without (I) and with a metal center (II) is shown below:

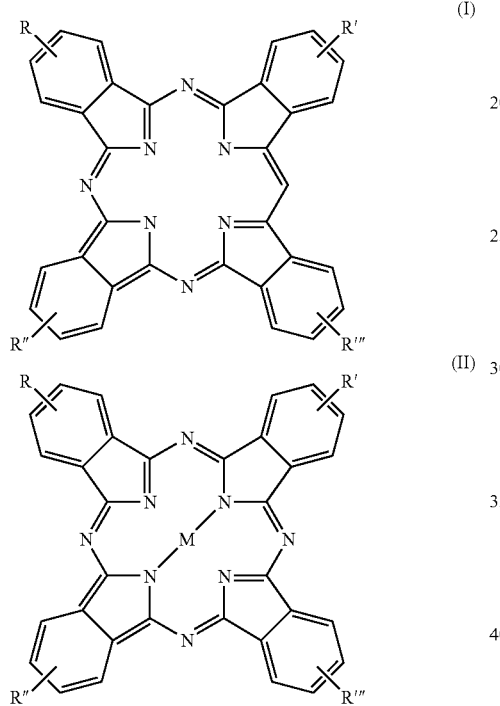

In the case of a phthalocyanine with a metal center, the metal center (M) can be for example, a transition metal, i.e., those metals falling within groups 3-12 of the Periodic Table, which include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, and lanthanum and the like.

Each R, R', R" and R'" (collectively, "R groups") can be independently groups such as hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the alkali metal salt of a sulfonate, carboxylate or phosphonate group; $C_1$ to $C_6$ alkoxy substituted by at least one of $C_1$ to $C_6$ alkyl, $C_1$ to $C_6$ alkoxy, or the alkali metal salt of a sulfonate, carboxylate or phosphonate group; and aryl substituted by at least one of $C_1$ to $C_6$ alkoxy, or the alkali metal salt of a sulfonate, carboxylate or phosphonate group; or two R groups can be taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group.

The polycyclic aromatic compound can be a porphyrin. Porphyrins can be those with or without metal centers. Derivatives of porphyrins substituted in the benzene rings have been used as pigments and dyes. The structure of a substituted porphyrin without (III) and with a metal center (IV) is shown below:

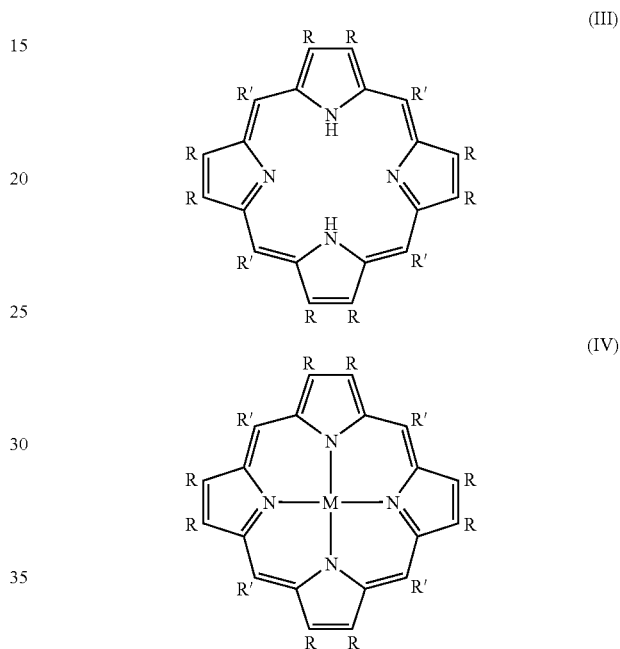

In the case of a porphyrin with a metal center, the metal center (M) can be for example, a "transition metal", i.e., those metals falling within groups 3-12 of the Periodic Table, which include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, lanthanum and the like.

Each R and R' (collectively, "R groups") can be independently selected from such groups as hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the alkali metal salt of a sulfonate, carboxylate or phosphonate group; $C_1$ to $C_6$ alkoxy substituted by at least one of $C_1$ to $C_6$ alkyl, $C_1$ to $C_6$ alkoxy, or the alkali metal salt of a sulfonate, carboxylate or phosphonate group; and aryl substituted by at least one of $C_1$ to $C_6$ alkyl, $C_1$ to $C_6$ alkoxy, or the alkali metal salt of a sulfonate, carboxylate or phosphonate group; or two R groups can be taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group.

The polycyclic aromatic compound can be a pyrene. The structure of a substituted pyrene (V) is shown below:

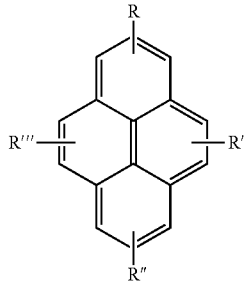

(V)

Each R, R', R" and R'" (collectively, "R groups") can be independently selected from such groups as hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the alkali metal salt of a sulfonate, carboxylate or phosphonate group; $C_1$ to $C_6$ alkoxy substituted by at least one of $C_1$ to $C_6$ alkyl, $C_1$ to $C_6$ alkoxy, or the alkali metal salt of a sulfonate, carboxylate or phosphonate group; and aryl substituted by at least one of $C_1$ to $C_6$ alkyl, $C_1$ to $C_6$ alkoxy, or the alkali metal salt of a sulfonate, carboxylate or phosphonate group; or two R groups can be taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group.

The polycyclic aromatic compound can be an anthracene. The structure of a substituted anthracene (VI) is shown below:

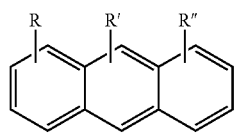

(VI)

Each R, R' and R" (collectively, "R groups") can be independently selected from such groups as hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; and aryl substituted by at least one of $C_1$ to $C_6$ alkyl, $C_1$ to $C_6$ alkoxy, or the salt of a sulfonate, carboxylate or phosphonate group; or two R groups can be taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group.

In general, polycyclic aromatic compounds are used in an amount of greater than or equal to about 0.0025 wt %, preferably greater than or equal to about 0.05 wt %, and more preferably greater than or equal to about 0.1 wt %, of the total weight of the composition. The polycyclic aromatic compounds are furthermore present in amounts of less than or equal to about 5 wt %/, preferably less than or equal to about 2 wt %, and more preferably less than or equal to about 1 wt %, of the total weight of the composition.

The polymeric composites can also include effective amounts of at least one additive such as anti-oxidants, flame retardants, drip retardants, dyes, pigments, colorants, stabilizers, small particle mineral fillers such as clay, mica, and talc, antistatic agents, plasticizers, lubricants, glass fibers (long, chopped or milled), and mixtures thereof. These additives are known in the art, as are their effective levels and methods of incorporation. Effective amounts of the additives vary widely, but they can be present in a total amount up to about 60% or more by weight, of the total weight of the composition. In general, additives such as anti-oxidants, flame retardants, drip retardants, dyes, pigments, colorants, stabilizers, antistatic agents, plasticizers, lubricants, and the like ar present in amounts of about 0.01 to about 5 wt %/ of the total weight of the composition, while small particle mineral fillers and glass fibers comprise about 1 to about 60 wt % of the total weight of the composition.

In the processing of such conductive composites, the polymeric resin along with the conductive components and optional additives may be compounded or melt blended in a commercially available melt blending production device such as, for example, a roll mill, dough mixer, a compounding machine and the like. The mixing can also be carried out in other continuous mixing equipment such as a single or twin-screw extruder, Buss kneader, and the like. Alternatively, mixing can be performed via a batch process in an internal batch mixer or the like. The polymeric resin may be initially in the form of powder, strands, or pellets and may be precompounded with the conductive filler in a Buss compounding machine or any other type of mixer capable of imparting shear to the mixture so as to bring the components into intimate contact and form a masterbatch. Such a process is detailed in U.S. Pat. Nos. 5,445,327, 5,556,892, and 5,744,235 to Creehan, U.S. Pat. No. 5,872,1 77 to Whitehouse, U.S. Pat. No. 5,654,357 to Menashi et al, U.S. Pat. No. 5,484,837 to King et al, U.S. Pat. No. 4,005,053 to Briggs et al. The masterbatch may then be extruded with additional polymeric resin or filler and at a suitable temperature into a strand that is quenched and pelletized. Alternately, the polymeric resin may be directly added to the extruder with the conductive fillers added either concurrently or sequentially into the extruder to form the conductive strand. The polycyclic aromatic compound can be added to the formulation by itself, or alternatively in the form of a masterbatch with the polymer which was extruded during a previous compounding step. Extruder temperature is generally sufficient to cause the polymeric resin to flow so that proper dispersion and wetting of the conductive and non-conductive fibrous filler may be achieved. The conductive pellets formed as a result of extrusion or conductive sheet obtained from a roll mill, is then subjected to a finishing or forming process such as injection molding, blow molding, vacuum forming and the like to form a usable conductive article. Such compostions with enhanced conductivity find particular utility in the manufacture of automobile and electronic parts.

Through addition of the polycyclic aromatic compound, lower levels of conductive particles are required in a conductive composite to achieve a desired level of conductivity.

Without being held to theory, it is believed that synergism between the conductive filler and the polycyclic aromatic compound leads to increased conductivity with a negligible effect on the mechanical properties of the composition. Desired levels of both bulk (in units of ohm-cm) and surface resistivity (in units of ohm/square) are $10^0$-$10^{12}$, but more preferably $10^1$-$10^9$. These lower levels of conductive filler can also improve the mechanical attributes of the polymer composite including such properties as tensile strength at yield and elongation at break.

The invention is further illustrated by the following non-limiting examples. All cited patents, patent applications, and other references are incorporated herein by reference in their entirety.

EXAMPLE 1

The following composites were generated on a 30 mm diameter Buss Kneader using standard polycarbonate processing conditions to observe the effect of copper phthalocyanine (0, 0.5 wt %, and 1.0 wt %) on the surface and volume resistivity of composites containing polycarbonate and graphite. The polycarbonate was a high flow polycarbonate with a typical melt flow index (MFI) of 20-30 g/10 min at a temperature of 300° C. and under a load of 1.2 kg, and the graphite was a natural graphite with an average particle size of 75 micrometers from Asbury Graphite Mills. The graphite content was held constant at 40 wt % of the total weight of the composite. These graphite particles were in the form of flakes.

Volume resistivity was measured according to ASTM D257 on 5 ASTM Tensile Bars. The tensile bars were place in a jig and then scored with a razor knife and cryofractured in liquid nitrogen to produce bars that were ⅛ inches×½ inches×2 inches. The ends of the bars were then coated with conductive silver paint on both ends to improve contact and allowed to dry for a minimum of 2 hours. Resistance measurements were then taken across the 2-inch length of the bar using a multimeter. The volume resistivity (reported in ohm-cm) was then calculated according to the following equation).

$$\text{Volume Reistivity(ohm} - \text{cm)} = \left| \frac{\text{Resistivity}(\Omega)}{12.6} \right|$$

Surface Resistivity was measured according to ASTM D257 on a Keithley Model 6517A Electrometer/High Resistance Meter with a Keithley 8009 Resistivity Test Fixture. In this method, voltage was applied to the test specimen (a ⅛ inch by 4 inch injection molded disk) and after a given delay period (to allow for system stabilization) the meter reported the surface resistivity of the sample in ohms/square. The applied voltage was maintained in the range of about 0.1 V to about 1 V for all testing. Resistivity is reported in Table 1 below.

TABLE 1

| Composition | Graphite particles, wt % | Copper phthalocyanine, wt % | Surface Resistivity, ohm/sq | Volume Resistivity, ohm-cm |
|---|---|---|---|---|
| 1 | 40 | 0 | $4.4 \times 10^7$ | $6.5 \times 10^2$ |
| 2 | 40 | 0.5 | $7.5 \times 10^5$ | $2.4 \times 10^2$ |
| 3 | 40 | 1 | $6.2 \times 10^4$ | $1.2 \times 10^2$ |

As can be seen in Table 1, addition of 0.5 wt % phthalocyanine decreases both the surface resistivity and volume resistivity of the composites.

EXAMPLE 2

The following composites were generated in a lab-scale batch mixer to observe the effect of unsubstituted phthalocyanine with no metal center on the electrical conductivity of composites. The composites contained a high flow polycarbonate with a typical MFI of 20-30 g/10 min at 300° C./1.2 kg and vapor grown carbon fibers from Applied Sciences having an average diameter of 80 nanometers as measured by Transmission Electron Microscopy. The required amount of polycarbonate was melted in the batch mixer and then phthalocyanine and VGCF mixed in appropriate proportion was added slowly to the melt at the rotor speed of 10 revolutions per minute, and at a melt temperature of about 280° C. The mixture was blended in the mixer for 6 minutes, the composite was taken out, and compression molded into discs. Results are shown in Table 2 below.

TABLE 2

| Compositon | MWNTs, wt % | Phthalocyanine, wt % | Volume Resistivity, kOhm-cm |
|---|---|---|---|
| 4 | 3.5 | 0 | 20235 |
| 5 | 3.5 | 0.5 | 2337 |
| 6 | 3.75 | 0 | 45 |
| 7 | 3.75 | 0.5 | 3 |

As is seen from Table 2, adding 0.5 wt % phthalocyanine decreases the volume resistivity of the composites

EXAMPLE 3

The following composites were generated on a 30 mm lab Scale Buss Kneader using standard polycarbonate/polybutylene terephthalate processing conditions. The effect of copper phthalocyanine on the percolation curve of a conductive carbon black (Columbian Chemicals) in a blend of polycarbonate and polybutylene terephthalate was observed. The percolation threshold is the filler loading required to achieve a desired level of conductivity in the compositions. The amount of carbon black was from 10 wt % to 15 wt % based on the total weight of the composite. The carbon black had a nominal BET Surface Area of 140 m²/g. The ratio of polycarbonate to polybutylene terephthalate was 75/25 based on resin weight and held constant during the experiments. As shown in FIG. 1, the composites with 0.5 wt % copper phthalocyanine have higher conductivities at lower concentrations of conductive carbon back that the composites without the phthalocyanine derivative.

EXAMPLE 4

Figure 2:
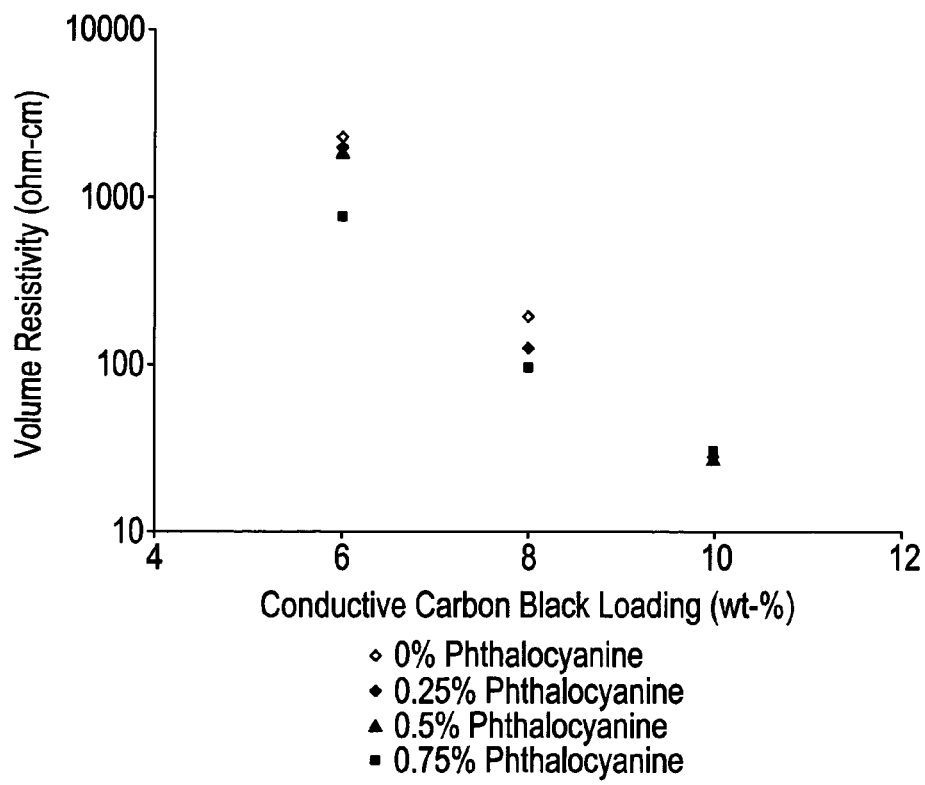
FIG. 2 shows the effect of copper phthalocyanine on the percolation curve of conductive carbon black in a blend of polycarbonate and polybutylene terephthalate.

The following composites were generated on a 30 mm lab Scale Buss Kneader using standard polycarbonate/polybutylene terephthalate processing conditions. The effect of copper phthalocyanine on the percolation curve of a conductive carbon black (Degussa) in a blend of polycarbonate and polybutylene terephthalate was observed., The amount of conductive carbon black was from 6 wt % to 10 wt %6 based on the total weight of the composite. The carbon black has a nominal BET Surface Area of 950 m²/g (square meters/gram), a much higher structure carbon black than that used in Example 3. The ratio of polycarbonate to polybutylene terephthalate was 75/25 based on resin weight and held constant during the experiments. As shown in FIG. 2, the addition of copper phthalocyanine to the composites decreased the volume resistivity at conductive carbon black loadings of 6 wt % and 8 wt %. At 10 wt % carbon black, the phthalocyanine has little effect on the volume resistivity. Thus, the addition of copper phthalocyanine to conductive compositions containing carbon black can reduce the measured volume resistivity at a particular concentration of added carbon black.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A polymeric composite composition, comprising:
   a polymeric resin, where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers, or a mixture comprising at least one of the foregoing thermoplastics;
   about 0.25 to about 15 wt % of a conductive filler, wherein the conductive fillers are single-walled carbon nanotubes, multi-walled carbon nanotubes, vapor grown carbon fibers, or a mixture comprising one or more of the foregoing conductive fillers; and
   about 0.0025 to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, titanium, vanadium, chromium, manganese, iron, cobalt, nickel, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, and lanthanum, the phthalocyanine polycyclic aromatic compound has a metal center, where the metal is scandium, yttrium, zirconium, niobium, technetium, rhodium, silver, cadmium, hafnium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition, and wherein the polymeric composite composition has a bulk electrical resistivity of about 1 ohm-cm to about $10^{12}$ ohm-cm.

2. The polymeric composition of claim 1, wherein the polymeric resin comprises about 10 to about 99.5 wt % of the total weight of the composition.

3. The polymeric composition of claim 1, wherein the phthalocyanine, porphyrin or pyrene polycyclic aromatic compound comprises at least one substituent.

4. The polymeric composition of claim 3, wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents.

5. A polymeric composition comprising, based on the total weight of the composition:
   about 10 to about 99.5 wt % of a polymeric resin, where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers, or a mixture comprising at least one of the foregoing thermoplastics;
   about 0.25 to about 15 wt % of a conductive filler, wherein the conductive fillers are single-walled carbon nanotubes, multi-walled carbon nanotubes, vapor grown carbon fibers, carbon black, or a mixture comprising one or more of the foregoing conductive fillers; and
   about 0.0025 to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, titanium, vanadium, chromium, manganese, iron, cobalt, nickel, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, and lanthanum, the phthalocyanine polycyclic aromatic compound has a metal center, where the metal is scandium, yttrium, zirconium, niobium, technetium, rhodium, silver, cadmium, hathium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition; wherein the carbon black has a surface area of greater than or equal to about 400 $m^2$/gm; and wherein and wherein the polymeric composition has a bulk electrical resistivity of about 1 ohm-cm to about $10^{12}$ ohm-cm.

6. A method of forming a polymeric composition comprising:

melt blending a polymeric resin, where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers, or a mixture comprising at least one of the foregoing thermoplastics, about 0.25 to about 15 wt % of a conductive filler, wherein the conductive fillers are single-walled carbon nanotubes, multi-walled carbon nanotubes, vapor grown carbon fibers, or a mixture comprising one or more of the foregoing conductive fillers, and about 0.0025 wt % to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, chromium, manganese, iron, cobalt, nickel, zinc, yttrium, zirconium, niobium, molybdenum, technetium, ruthenium, rhodium, silver, cadmium, hafnium, tantalum, tungsten, rhenium, osmium, iridium, platinum, gold, mercury, and lanthanum, the phthalocyanine polycyclic aromatic compound has a metal center, where the metal is scandium, titanium, vanadium, yttrium, zirconium, niobium, technetium, rhodium, palladium, silver, cadmium, hafnium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition; and wherein the electrical conductivity of the polymeric composition is enhanced relative to the same composition without the polycyclic aromatic compound.

7. A method of forming a polymeric composition comprising:

melt blending a polymeric resin where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers, or a mixture comprising at least one of the foregoing thermoplastics, about 0.25 to about 15 wt % of a conductive filler, wherein the conductive fillers are single-walled carbon nanotubes, multi-walled carbon nanotubes, vapor grown carbon fibers, carbon black, or a mixture comprising one or more of the foregoing conductive fillers, and about 0.0025 wt % to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, chromium, manganese, iron, cobalt, nickel, zinc, yttrium, zirconium, niobium, molybdenum, technetium, ruthenium, rhodium, silver, cadmium, hafnium, tantalum, tungsten, rhenium, osmium, iridium, platinum, gold, mercury, and lanthanum, the phthalocyanine polycyclic aromatic compound has a metal center, where the metal is scandium, titanium, vanadium, yttrium, zirconium, niobium, technetium, rhodium, palladium, silver, cadmium, hathium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition; wherein the carbon black has a surface area of greater than or equal to about 400 $m^2/gm$; and extruding the melt blend; wherein the polymeric composition has a bulk electrical resistivity of about 1 ohm-cm to about $10^{12}$ ohm-cm.

8. A polymeric composite composition, comprising:

a polymeric resin where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers, or a mixture comprising at least one of the foregoing thermoplastics;

a conductive filler; wherein the conductive fillers are single-walled carbon nanotubes, graphite; multi-walled carbon nanotubes, vapor grown carbon fibers, carbon black, or a mixture comprising one or more of the foregoing conductive fillers; and wherein the carbon black, if present, has a surface area of greater than or equal to about 400 $m^2/gm$; wherein the single-walled carbon nanotubes, multi-walled carbon nanotubes, vapor grown carbon fibers and carbon black, if present, are present in an amount of about 0.25 to about 15 wt %; and further wherein the graphite, if present, is in an amount of about 20 to about 60 wt %, wherein the wt %'s are based on the total weight of the polymeric composition; and about 0.0025 to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, chromium, manganese, iron, cobalt, nickel, zinc, yttrium, zirconium, niobium, molybdenum, technetium, ruthenium, rhodium, silver, cadmium, hafnium, tantalum, tungsten, rhenium, osmium, iridium, platinum, gold, mercury, and lanthanum selected from the group consisting of a phthalocyanine, a porphyrin, a pyrene, an anthracene, or a mixture comprising one or more of the foregoing polycyclic aromatic compounds, the phthalocyanine polycyclic aromatic compound has a metal center, where the metal is scandium, titanium, vanadium, yttrium, zirconium, niobium, technetium, rhodium, palladium, silver, cadmium, hafnium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfmyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition; and wherein the polymeric composite composition has a bulk electrical resistivity of about 1 ohm-cm to about $10^{12}$ ohm-cm.

9. The polymeric composition of claim 8, wherein the phthalocyanine, porphyrin or pyrene polycyclic aromatic compound comprises at least one substituent.

10. A polymeric composite composition, comprising:

a polymeric resin where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychloro trifluoroethylene, polyvinylidene fluoride, polyvinyl fluoride, polyetherketone, polyether etherketone, polyether ketone ketone, liquid crystal polymers, or a mixture comprising at least one of the foregoing thermoplastics;

about 0.25 to about 15 wt % of carbon black; wherein the carbon black has a surface area of greater than or equal to about 400 $m^2/gm$; and about 0.0025 to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, titanium, vanadium, chromium, manganese, iron, cobalt, nickel, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, and lanthanum, the phthalocyanine polycyclic aromatic compound has a metal center, where the metal is scandium, yttrium, zirconium, niobium, technetium, rhodium, silver, cadmium, hafnium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition; and wherein the polymeric composite composition has a bulk electrical resistivity of about 1 ohm-cm to about $10^{12}$ ohm-cm.

11. The polymeric composition of claim 10, wherein the phthalocyanine, porphyrin or pyrene polycyclic aromatic compound comprises at least one substituent.

12. A method of forming a polymeric composition comprising:
melt blending a polymeric resin where the polymeric resin is a thermoplastic resin that is polyacetal, polyacrylic, styrene acrylonitrile, acrylonitrile-butadiene-styrene, polycarbonate, polystyrene, polyphenylene ether, polyethylene terephthalate, polybutylene terephthalate, Nylon, polyamideimide, polyarylate, polyurethane, ethylene propylene diene rubber, ethylene propylene diene monomer, polyarylsulfone, polyethersulfone, polyphenylene sulfide, polyvinyl chloride, polysulfone, polyetherimide, polytetrafluoroethylene, fluorinated ethylene propylene, perfluoroalkoxyethylene, polychlorotrifluoroethylene, polyvinylidene fluoride, polyvinyl fluoride, polyetherketone, polyether etherketone, polyether ketone ketone, liquid crystal polymers, or a mixture comprising at least one of the foregoing thermoplastics, about 0.25 to about 15 wt % of carbon black, and about 0.0025 wt % to less than 1 wt % of a polycyclic aromatic compound, wherein the polycyclic aromatic compound is a phthalocyanine, a porphyrin, a pyrene, an anthracene, or a mixture comprising one or more of the foregoing polycyclic aromatic compounds, further wherein the porphyrin polycyclic aromatic compound has a metal center, where the metal is scandium, chromium, manganese, iron, cobalt, nickel, zinc, yttrium, zirconium, niobium, molybdenum, technetium, ruthenium, rhodium, silver, cadmium, hathium, tantalum, tungsten, rhenium, osmium, iridium, platinum, gold, mercury, and lanthanum, the phthalocyanine polycyclic aromatic compound has a metal center, where the metal is scandium, titanium, vanadium, yttrium, zirconium, niobium, technetium, rhodium, palladium, silver, cadmium, hathium, tantalum, tungsten, rhenium, osmium, iridium, gold, mercury, and lanthanum, wherein the anthracene polycyclic compound comprises at least one substituent, further wherein the substituent is hydrogen; a halogen atom; an oxygen atom; a sulfur atom; a hydroxyl group; a carbonyl group; a sulfonyl group; a sulfinyl group; an alkyleneoxyalkylene group; a phosphonyl group; a phosphinyl group; an amino group; an imino group; $C_1$ to $C_6$ alkyl; $C_1$ to $C_6$ alkoxy; aryl; $C_1$ to $C_6$ alkyl substituted by at least one of $C_1$ to $C_6$ alkyl, $C_1$ to $C_6$ alkoxy, or the salt of a sulfonate, carboxylate or phosphonate group; $C_1$ to $C_6$ alkoxy substituted by at least one of $C_1$ to $C_6$ alkyl, $C_1$ to $C_6$ alkoxy, or the salt of a sulfonate, carboxylate or phosphonate group; aryl substituted by at least one of $C_1$ to $C_6$ alkyl, $C_1$ to $C_6$ alkoxy, or the salt of a sulfonate, carboxylate or phosphonate group; or two substituents taken together to form a six membered aromatic ring in combination with the carbon atoms to which they are attached, said aromatic ring optionally substituted by $C_1$ to $C_6$ alkyl, $C_1$ to $C_6$ alkoxy, the alkali metal salt of a sulfonate, carboxylate or phosphonate group, or a mixture comprising one or more of the foregoing substituents wherein the wt % is based on the total weight of the polymeric composition; wherein the carbon black has a surface area of greater than or equal to about 400 $m^2/gm$; and wherein the electrical conductivity of the polymeric composition is enhanced relative to the same composition without the polycyclic aromatic compound.

* * * * *